US010632869B2

(12) United States Patent
Mizuno et al.

(10) Patent No.: US 10,632,869 B2
(45) Date of Patent: Apr. 28, 2020

(54) SEAT DEVICE FOR VEHICLE

(71) Applicant: AISIN SEIKI KABUSHIKI KAISHA, Kariya-shi (JP)

(72) Inventors: Ryosuke Mizuno, Toyota (JP); Katsuya Nozue, Toyohashi (JP); Shogo Sakai, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 10 days.

(21) Appl. No.: 16/175,978

(22) Filed: Oct. 31, 2018

(65) Prior Publication Data

US 2019/0152356 A1 May 23, 2019

(30) Foreign Application Priority Data

Nov. 17, 2017 (JP) .................................. 2017-222063

(51) Int. Cl.
*B60N 2/26* (2006.01)
*B60N 2/32* (2006.01)
*B60N 2/90* (2018.01)
*B60N 2/30* (2006.01)

(52) U.S. Cl.
CPC ............. *B60N 2/26* (2013.01); *B60N 2/3084* (2013.01); *B60N 2/32* (2013.01); *B60N 2/914* (2018.02); *B60N 2/99* (2018.02)

(58) Field of Classification Search
CPC .......... B60N 2/26; B60N 2/3084; B60N 2/32; B60N 2/99; B60N 2/986; B60N 2/914
See application file for complete search history.

(56) References Cited

U.S. PATENT DOCUMENTS

| | | | | | |
|---|---|---|---|---|---|
| 4,619,481 | A | * | 10/1986 | Grudzinskas | A47C 7/467 297/284.1 |
| 4,707,027 | A | * | 11/1987 | Horvath | B60N 2/914 297/284.6 |
| 4,920,591 | A | * | 5/1990 | Sekido | B60N 2/665 297/287 |
| 5,082,326 | A | * | 1/1992 | Sekido | B60N 2/914 297/284.6 |
| 5,161,855 | A | * | 11/1992 | Harmon | B60N 2/3084 297/238 |

(Continued)

FOREIGN PATENT DOCUMENTS

| | | |
|---|---|---|
| JP | 8-11604 | 1/1996 |
| JP | 10-16618 | 1/1998 |

(Continued)

OTHER PUBLICATIONS

Extended European Search Report dated May 17, 2019 in Patent Application No. 18206741.3, 7 pages.

*Primary Examiner* — David E Allred
(74) *Attorney, Agent, or Firm* — Oblon, McClelland, Maier & Neustadt, L.L.P.

(57) ABSTRACT

A seat device for a vehicle includes a first airbag being disposed at a side wall portion of a recessed portion which is configured to accommodate an occupant of a seat therein, and a second airbag being disposed at an outer peripheral rim portion of the recessed portion, the outer peripheral rim portion which is connected to the side wall portion. The first airbag and the second airbag expand to form a support shape at the recessed portion in a seat width direction.

7 Claims, 7 Drawing Sheets

(56) References Cited

U.S. PATENT DOCUMENTS

| | | | | |
|---|---|---|---|---|
| 5,282,666 A | * | 2/1994 | Demick | B60N 2/3081 |
| | | | | 297/237 |
| 5,383,707 A | * | 1/1995 | Osenkowski | B60N 2/3084 |
| | | | | 297/238 |
| 5,383,711 A | * | 1/1995 | Houghteling | A47D 15/006 |
| | | | | 297/397 |
| 5,743,593 A | * | 4/1998 | Vogt | B60N 2/3084 |
| | | | | 297/238 |
| 5,918,933 A | * | 7/1999 | Hutchinson | A47C 7/72 |
| | | | | 128/869 |
| 7,413,249 B2 | | 8/2008 | Leutert | |
| 2012/0187729 A1 | * | 7/2012 | Fukawatase | B60N 2/99 |
| | | | | 297/216.1 |
| 2017/0144571 A1 | * | 5/2017 | Chiba | B62J 1/12 |
| 2017/0225640 A1 | | 8/2017 | Ohno | |
| 2018/0134186 A1 | | 5/2018 | Mizuno et al. | |
| 2018/0134190 A1 | | 5/2018 | Mizuno et al. | |

FOREIGN PATENT DOCUMENTS

| | | |
|---|---|---|
| JP | 2015-27410 | 2/2015 |
| JP | 2018-79800 | 5/2018 |
| JP | 2018-79820 | 5/2018 |

* cited by examiner

SEAT DEVICE FOR VEHICLE

CROSS REFERENCE TO RELATED APPLICATIONS

This application is based on and claims priority under 35 U.S.C. § 119 to Japanese Patent Application 2017-222063, filed on Nov. 17, 2017, the entire content of which is incorporated herein by reference.

TECHNICAL FIELD

This disclosure generally relates to a seat device for a vehicle.

BACKGROUND DISCUSSION

A known seat for a vehicle employs a balloon body (an airbag) that swells by being filled with air. For example, a configuration in which a so-called balloon-type child seat is retracted in a retracting chamber provided inside a seatback or a seat cushion is disclosed in U.S. Pat. No. 7,413,249 (hereinafter referred to as Patent reference 1). In the conventional example, the child seat which swells within the retracting chamber is configured to be deployed on the seat by pushing to open a lid portion which is provided at a backrest surface of the seatback or at a seat surface of the seat cushion.

However, the child seat which is formed by the aforementioned conventional technology is configured to support a load of an occupant in a seat width direction only by the balloon body. Thus, there is an issue in which support strength in the seat width direction is difficult to be enhanced. Accordingly, favorable seat support performance may not be secured, and there still is a room for improvement.

A need thus exists for a seat device for a vehicle which is not susceptible to the drawback mentioned above.

SUMMARY

According to an aspect of this disclosure, a seat device for a vehicle includes a first airbag being disposed at a side wall portion of a recessed portion which is configured to accommodate an occupant of a seat therein, and a second airbag being disposed at an outer peripheral rim portion of the recessed portion, the outer peripheral rim portion which is connected to the side wall portion. The first airbag and the second airbag expand to form a support shape at the recessed portion in a seat width direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
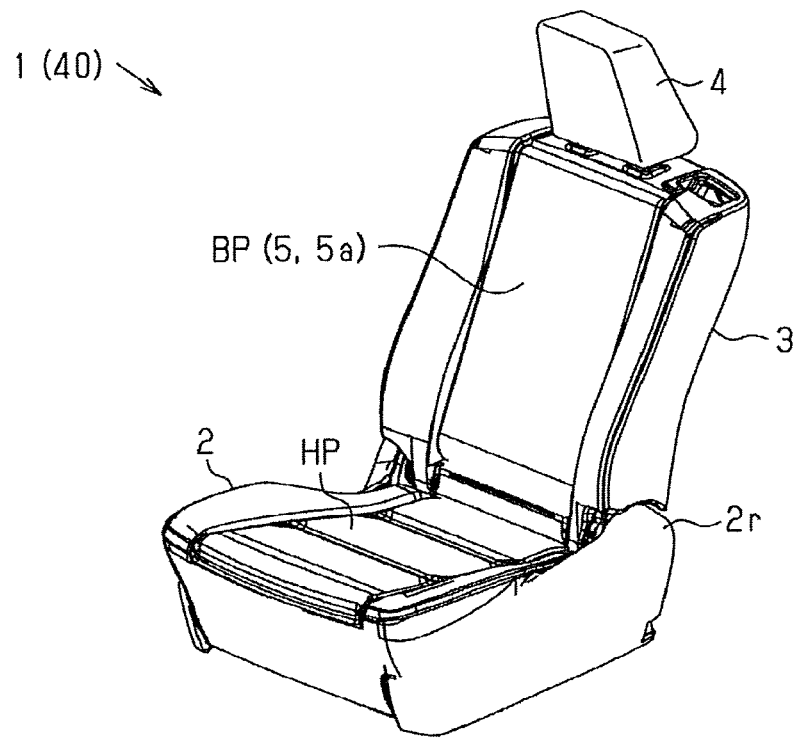
FIG. 1 is a perspective view of a seat according to an embodiment (normal mode) disclosed here.
Figure 2:
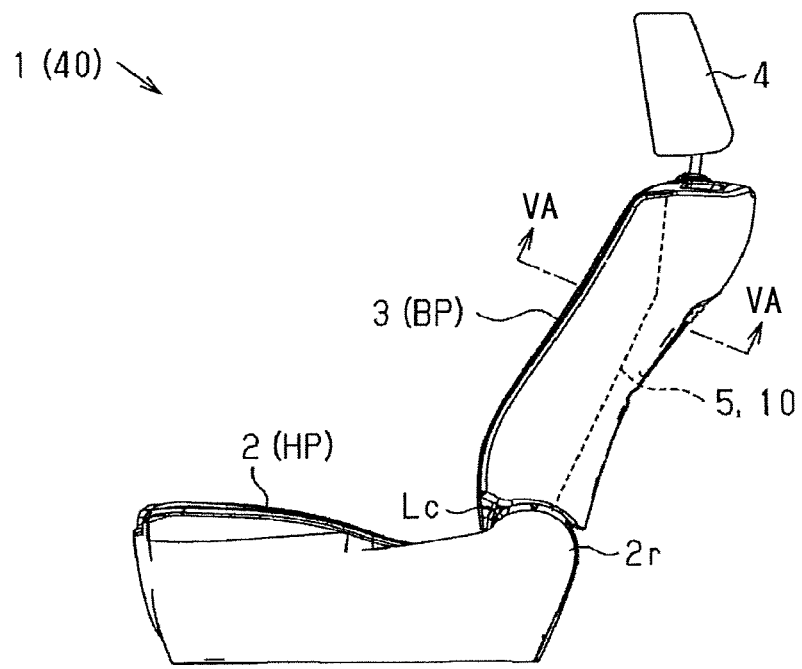
FIG. 2 is a side view of the seat (normal mode)

A seat device for a vehicle of an embodiment will hereunder be explained with reference to the drawings. As illustrated in FIGS. 1 and 2, a seat 1 for the vehicle includes a seat cushion 2 configuring a seat portion HP, and a seatback 3 provided at a rear end portion 2r of the seat cushion 2, in a case where an adult occupant is seated on the seat 1. A headrest 4 is attached on an upper end portion of the seatback 3 configuring a backrest portion BP of the seat 1.

Figure 3:
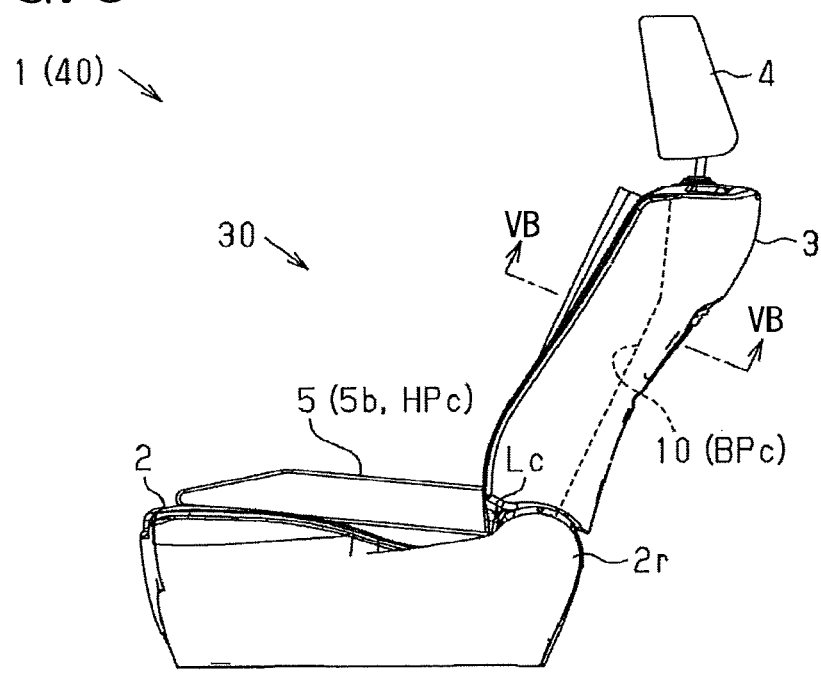
FIG. 3 is a side view of the seat (child mode)
Figure 4:
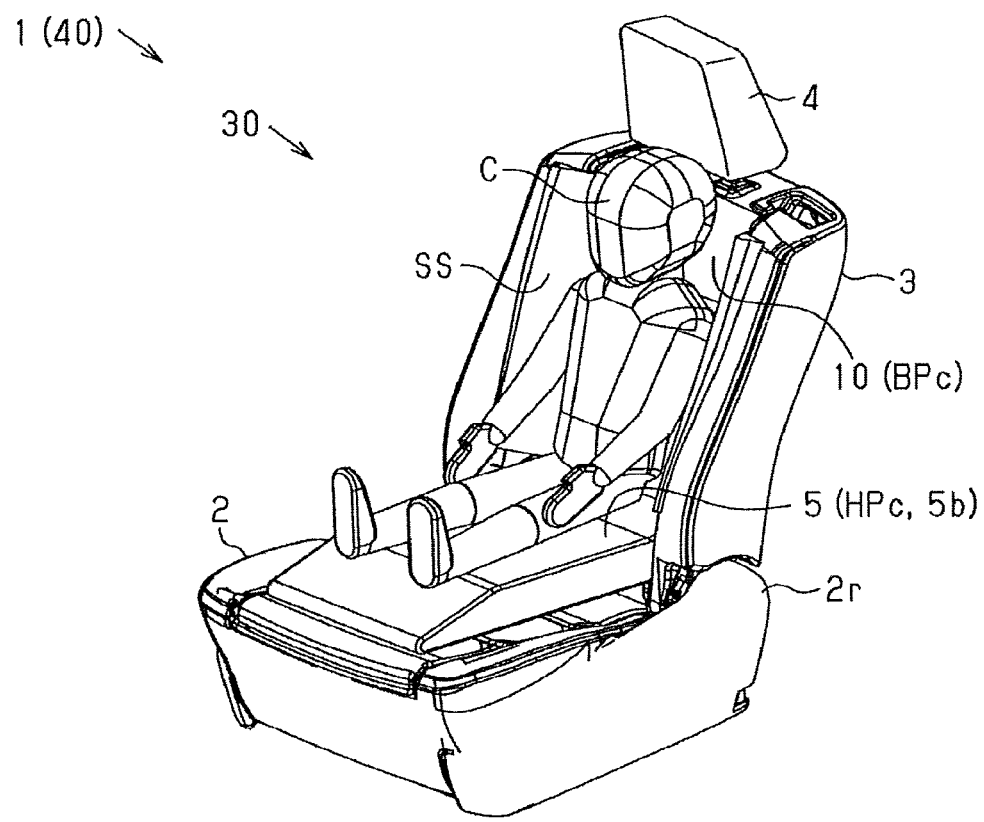
FIG. 4 is a perspective view of the seat (child mode)

As shown in FIGS. 3 and 4, the seat 1 in the embodiment includes a movable cushion 5 inclined on the seat cushion 2, the movable cushion 5 which is a divided part of the seatback 3. The seat 1 in the embodiment includes a back surface 5b of the movable cushion 5 inclined on the seat cushion 2, the back surface 5b forming a seat portion HPc for child. The movable cushion 5 is the divided part of the seatback 3, the divided being moved from the seatback 3 to form a recessed portion 10 at the seatback 3, the recessed portion 10 constituting a backrest portion BPc for child. The seat 1 in the embodiment is shifted to a child mode supporting a child occupant C from a normal mode (see FIGS. 1 and 2) supporting an adult occupant.

Specifically, as shown in FIGS. 3, 4, 5A and 5B, the seat 1 in the embodiment includes the movable cushion 5 having a substantially plate shape including a rectangular cross section. The movable cushion 5 is assembled on the seatback 3 in a state of being rotatable about a rotary axis Lc extending in a seat width direction. The seatback 3 is provided with the recessed portion 10 having a substantially C-shaped cross section supporting an outer shape of the movable cushion 5.

That is, the movable cushion 5 in the embodiment is retracted in the recessed portion 10 provided at the seatback 3 in a standing state by rotating in the clockwise direction in FIG. 3. The seat 1 in the embodiment includes a surface 5a of the movable cushion 5 that is integrally retracted in the seatback 3, the surface 5a forming the backrest portion BP for adult along with the seatback 3.

Figure 5A:
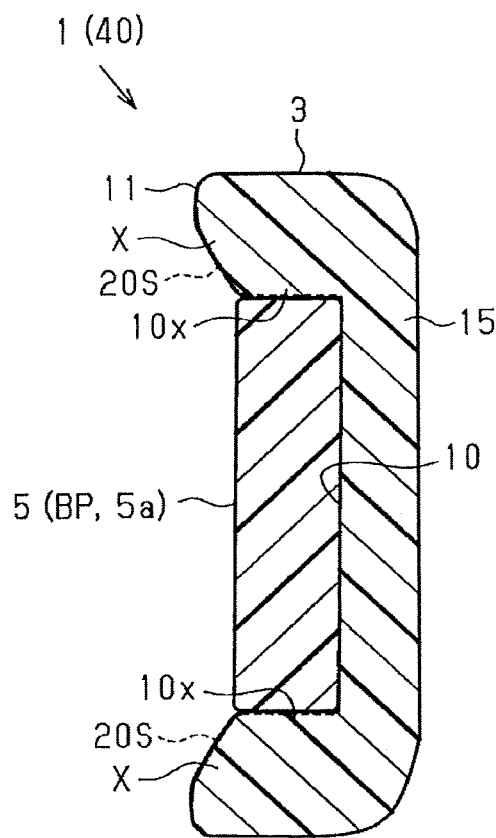
FIG. 5A is a cross sectional view of a seatback taken along line VA-VA in FIG. 2.
Figure 5B:
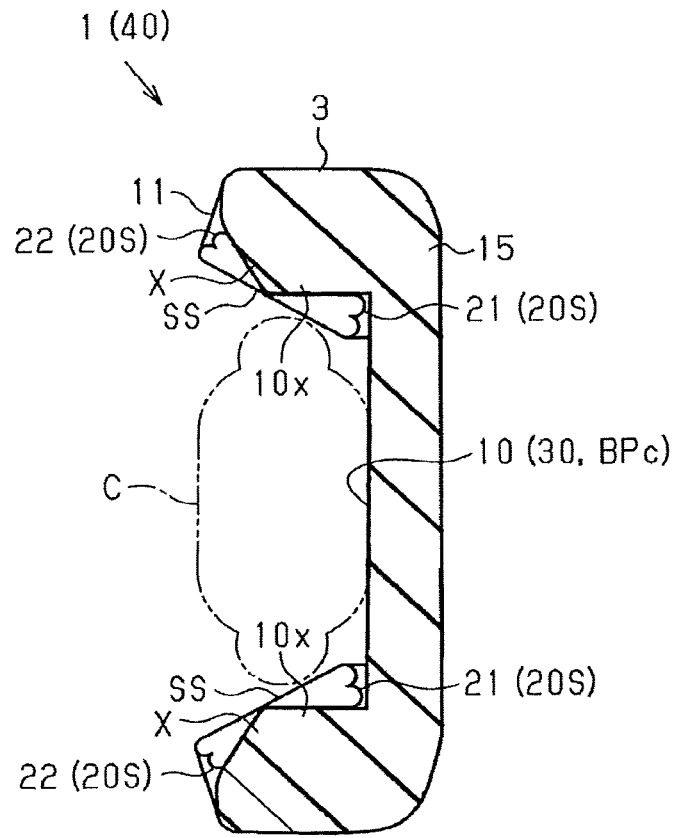
FIG. 5B is another cross sectional view of the seatback taken along line VB-VB in FIG. 3.

Further specifically, as illustrated in FIGS. 5A and 5B, the seatback 3 in the embodiment is provided with an airbag 20S for seat support expanding and contracting inside a cover 1 of the seatback 3. Specifically, the airbag 20S is arranged between a cushion material 15 and the cover 11 forming an outer shape of the seatback 3. The seatback 3 includes a first airbag 21 at a position corresponding to a side wall portion 10X which is provided inside the recessed portion 10 in the seat width direction (upper-lower direction in FIG. 5). The seatback 3 includes a second airbag 22 at an outer peripheral rim portion X of the recessed portion 10 connected to the side wall portion 10x at an outer side of the recessed portion 10 in the seat width direction. In the seat 1 in the embodiment, the recessed portion 10 configuring the backrest portion BPc of the child seat 30 includes a support form SS in the seat width direction having the first and second airbags 21, 22 as airbags 20S for seat support.

Figure 6:
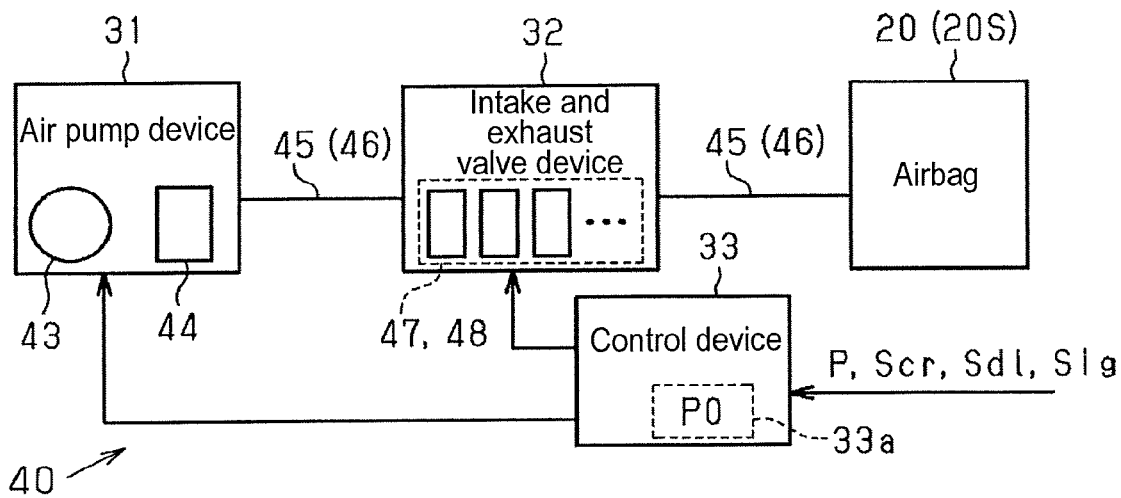
FIG. 6 is a schematic configuration view of a seat device (an airbag control system)

As shown in FIG. 6, the seat 1 in the embodiment is provided with an air pump device 31 pressure-feeding air to the airbags 20 provided at the seat 1, the airbags 20 including the first and second airbags 21, 22 configuring the airbags 20S for seat support. An intake and exhaust valve device 32 is disposed between the air pump device 31 and the airbags 20. The air pump device 31 and the intake and exhaust valve device 32 are controlled by a control device 33. The seat 1 in the embodiment is provided with a seat device 40 that deploys the child seat 30 (see FIG. 4) including the backrest portion BPc and the seat portion HPc for child on the seat 1 as described above, and that may set the favorable support form SS in the seat width direction for the child occupant C seated on the child seat 30.

Specifically, the air pump device 31 in the embodiment employs an electric pump driving a pump mechanism 44 having a motor 43 as a drive source. The intake and exhaust valve device 32 is connected to the airbag 20 and the air pump device 31 via air tubes 45 which is made of resin having flexibility. That is, the seat device 40 in the embodiment includes an air flow path 46 communicating with the airbags 20 and the air pump device 31 by inner paths of the air tube 45 and an inner path of the intake and exhaust valve device 32. The intake and exhaust valve device 32 in the embodiment includes an intake valve 47 and an exhaust valve 48 which are disposed at a middle way of the flow path 46.

The control device 33 in the embodiment is inputted with an inner pressure level P of the airbag 20, and an operation input signal Scr, an ignition signal Sig, or a door lock signal Sdl relative to an operation switch. The control device 33 in the embodiment controls the operation of the air pump device 31 and the intake and exhaust valve device 32 so as to expand and contract the airbags 20 based on the control signals of the control device 33.

Specifically, the control device 33 in the embodiment sets target values (inner pressure target values P0) relative to the inner pressures P of the airbags 20. The control device 33 retains the inner target values P0 in a memory range 33a. In the seat device 40 in the embodiment, the inner pressure target values P0 of the airbags 20 are configured to be updated at any times by an user who sets an optimal seat support form by using an adjustment switch.

That is, in a child mode, the user (for example, a guardian) operates the airbags 20S (21, 22) for seat support to expand and contract to set the optimal support form SS in the seat width direction in a state where the child occupant c is seated on the child seat 30 deployed on the seat 1 so that the inner pressure target values P0 of the airbags 20S are memorized in the memory range 33a. The control device 33 in the embodiment controls the operation of the air pump device 31 and the intake and exhaust valve device 32 to match the detected inner pressures P of the airbags 20S for seat support with the inner pressure target values P0.

Figure 7:
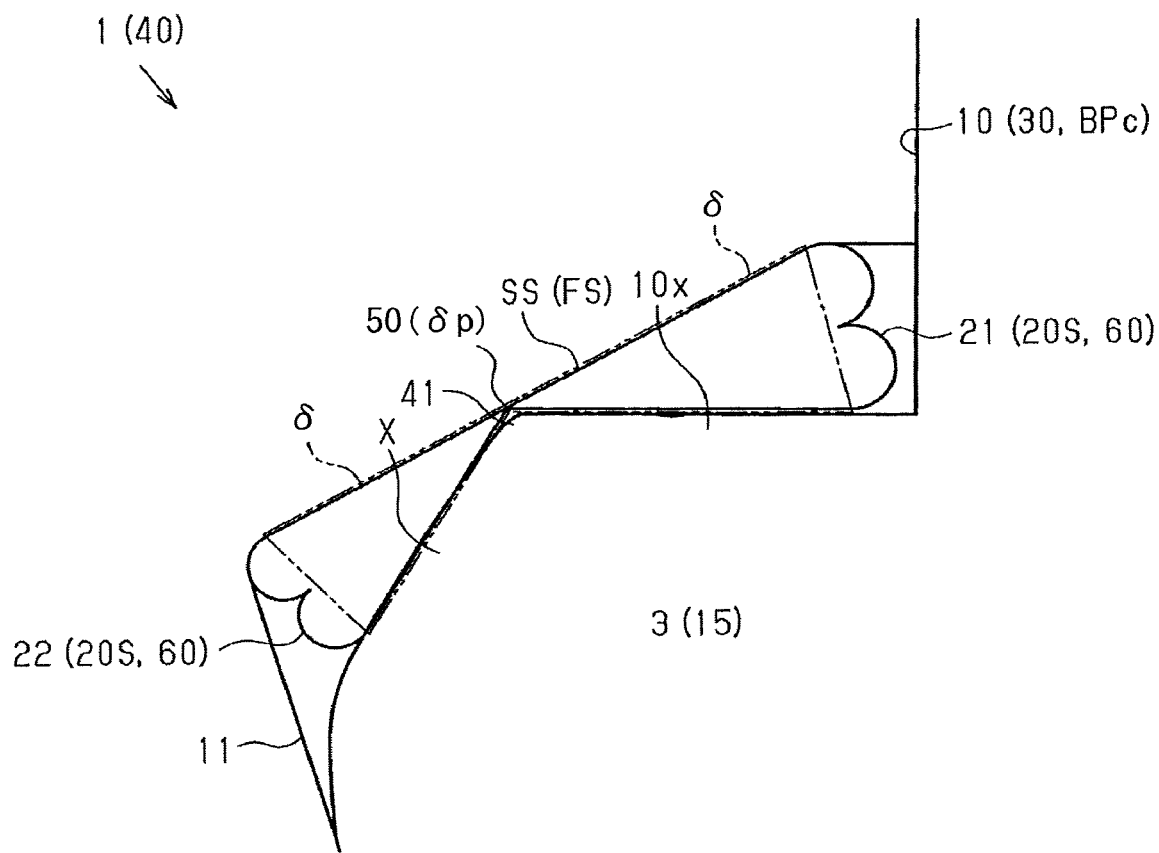
FIG. 7 is an enlarged cross sectional view of a vicinity of an airbag for seat support provided at a seatback.

More specifically, as illustrated in FIGS. 5B and 7, in the seat device 40 in the embodiment, the first and second airbags 21, 22 each includes a triangle cross section δ tapered toward a ridgeline portion 41 that is disposed between the side wall portion 10x and the outer peripheral rim portion X of the recessed portion 10. The seat device 40 in the embodiment is configured to set a support surface FS which is substantially flat on the support shape SS in the seat width direction, the support shape SS which is formed such that the expanding first and second airbags 21, 22 press the cover 11 of the seatback 3.

Figure 8:
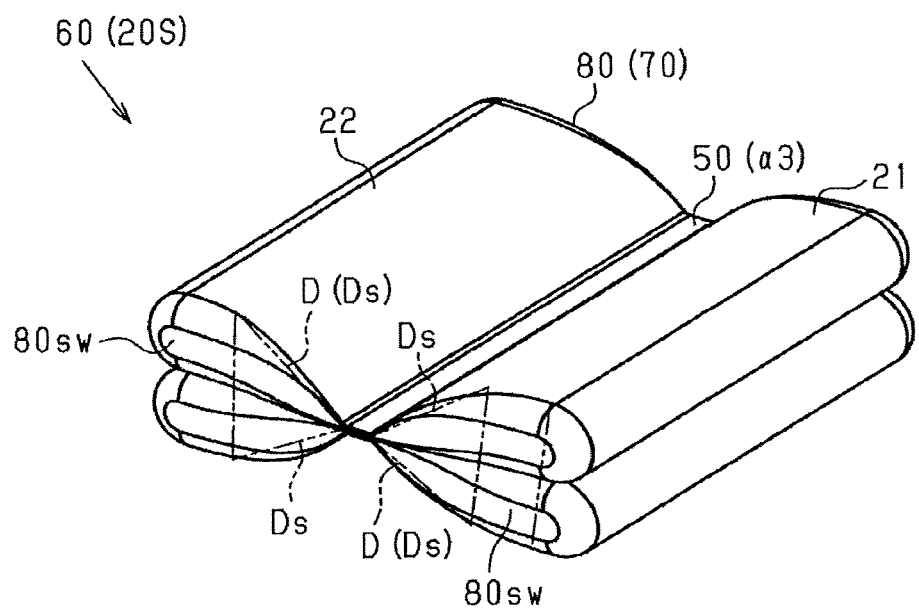
FIG. 8 is a perspective view of the airbag for seat support (expanding state)

As shown in FIGS. 7 and 8, in the seat device 40 in the embodiment, the first and second airbags 21, 22 are integrated to be a single airbag 60 by including top portions δp of the triangle cross sections δ of the first and second airbags 21, 22 as connection portions 50. That is, the airbag 60 is mounted on the seatback 3 such that the connection portions 50 between the first and second airbags 21, 22 extending linearly are along with the ridgeline portion 41 between the side wall portion 10x and the outer peripheral rim portion X of the recessed portion 10 provided at the seatback 3. Accordingly, in the seat device 40 in the embodiment, the airbags 20S (21, 22) for seat support may be easily mounted on the seatback 3.

Figure 9:
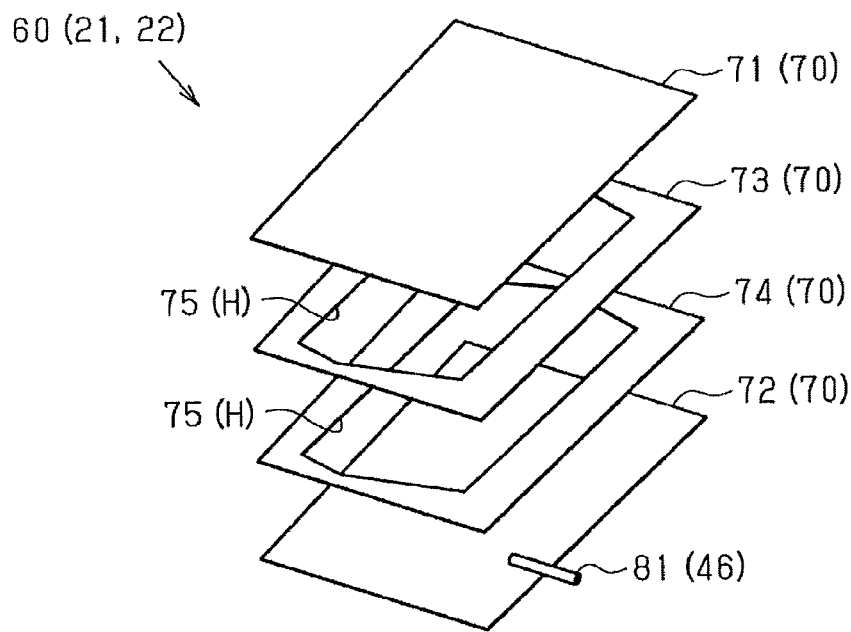
FIG. 9 is an exploded perspective view of the airbag for seat support.
Figure 10:
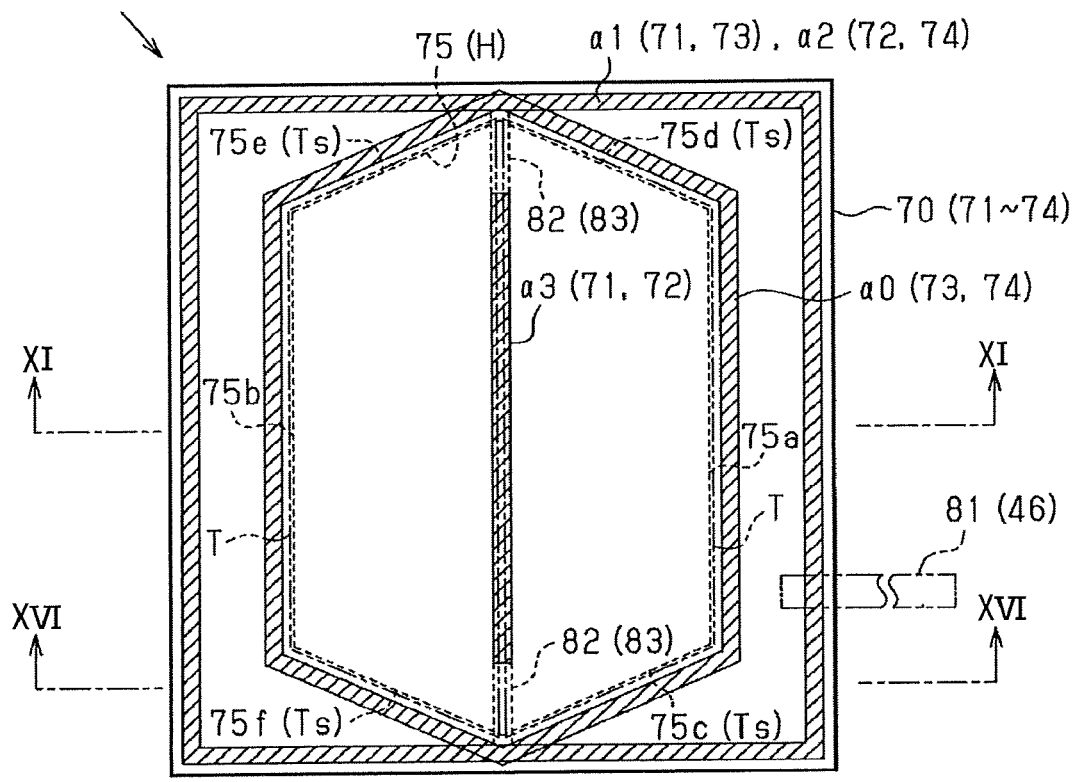
FIG. 10 is a plan view of the airbag for seat support (contracting state)
Figure 11:
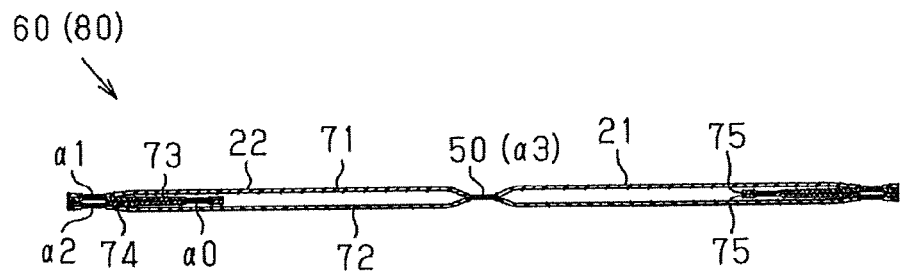
FIG. 11 is a cross sectional view of the airbag for seat support (cross sectional view taken along line XI-XI in FIG. 10, expanding state)

Next, the construction of the airbag 60 in which the first and second airbags 21, 22 serving as the airbags 20S for seat support are integrated with each other will hereunder be explained. As illustrated in FIGS. 9 to 11, in the seat device 40 in the embodiment, the airbag 60 (21, 22) for seat support provided at the recessed portion 10 of the seatback 3 is formed by four seat materials 70 (71 to 74) which are made of resin including flexibility and which are bonded to one another in a thickness direction (an upper-lower direction in FIGS. 9 and 11, an orthogonal direction of the page in FIG. 10).

Specifically, the airbag 60 includes a first outer seat material 71 and a second outer seat material 72 that each includes the same outer dimension and that each is trimmed in a rectangular shape. The airbag 60 is provided with first and second intermediate seat materials 73, 74 that each includes the same outer dimension and that each is trimmed in the rectangular shape. The first and second intermediate seat materials 73, 74 each includes a hole portion 75 that is formed in a hexagon shape H and that includes two sides 75a, 75b extending in a longitudinal direction (upper-lower direction in FIG. 10). The airbag 60 in the embodiment is configured such that the four seat materials 70 (71 to 74) are bonded to one another in a state where the first and second intermediate seat materials 73, 74 are sandwiched between the first and second outer seat materials 71, 72.

Figure 12:
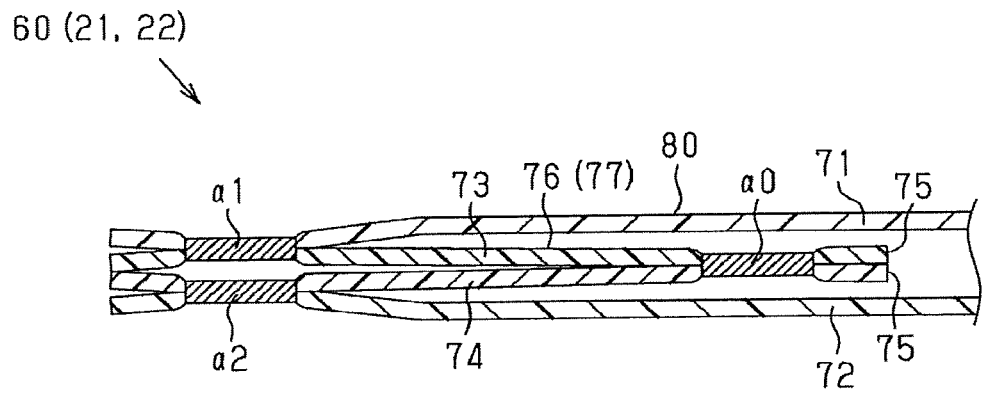
FIG. 12 is an enlarged cross sectional view of a corrugated part formed by first and second intermediate seat materials (contracting state)

Specifically, as illustrated in FIGS. 10 to 12, in the airbag 60 in the embodiment, the first and second intermediate seat materials 73, 74 are laminated with each other in a state where the positions of the hexagon shapes H of the hole portions 75 are matched with each other. The airbag 60 in the embodiment is configured such that the first and second intermediate seat material 73, 74 are bonded to each other as peripheral rim portions of the hole portions 75 are bonded to each other over the whole periphery thereof.

In the airbag 60 in the embodiment, an outer periphery portion of the first outer seat material 71 is bonded to an outer periphery portion of the first intermediate seat material 73 over the whole periphery of the first outer seat material 71. The second outer seat material 72 is bonded to an outer periphery portion of the second intermediate seat material 74 over the whole periphery of the second outer seat material 72.

The airbag 60 in the embodiment includes a bonding portion α0 between the first intermediate seat material 73 and the second intermediate seat material 74 by welding. A bonding portion α1 is formed by the welding of the first outer seat material 71 and the first intermediate seat material 73. A bonding portion α2 is formed by the welding of the second outer seat material 72 and the second intermediate seat material 74.

Figure 13:
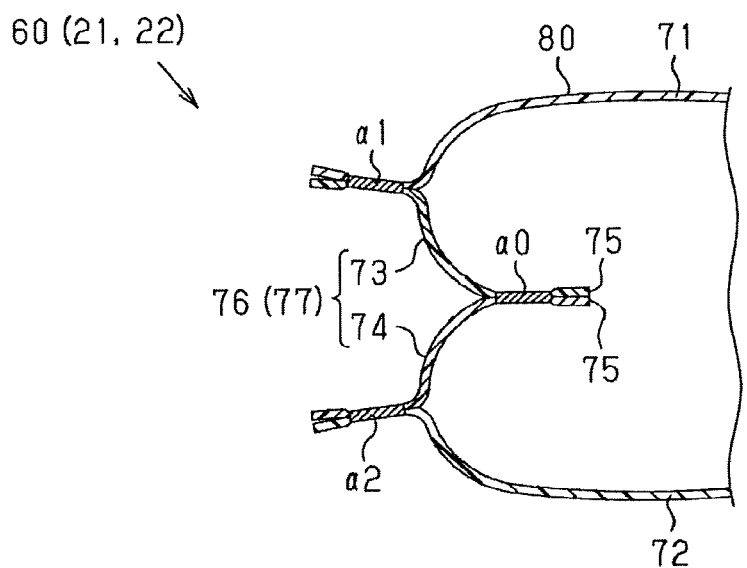
FIG. 13 is an enlarged cross sectional view of the corrugated part formed by the first and second intermediate seat materials (expanding state)

That is, as shown in FIGS. 12 and 13, the airbag 60 in the embodiment is configured such that the first and second intermediate seat materials 73, 74 include a corrugated structure 76 to form an intermediate member 77 connecting the first and second outer seat materials 71, 72 by bonding the seat materials 70 (71 to 74). Accordingly, a bag body 80 expanding and contracting in a thickness direction (FIGS. 12 and 13, upper-lower direction) of the seat materials 70 (71 to 74) is provided.

Figure 14:
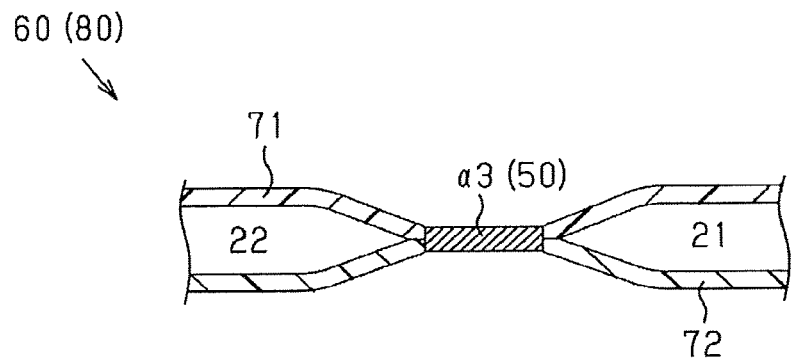
FIG. 14 is an enlarged cross sectional view of a vicinity of a bonding portion between a first outer seat material and a second outer seat material.

As shown in FIGS. 10, 11 and 14, the airbag 60 in the embodiment includes a bonding portion α3 bonding the first outer seat material 71 and the second outer seat material 72 at a position where the hole portions 75 provided at the first and second intermediate seat materials 73, 74 are overlapped with each other. The bonding portion α3 is formed by the welding of the first outer seat material 71 and the second outer seat material 72.

Specifically, as illustrated in FIG. 10, the bonding portion α3 extends in the longitudinal direction so as to be parallel to the two sides 75a, 75b of the hole portion 75 extending in the longitudinal direction of the seat materials 70 (71 to 74). That is, the bonding portion α3 is extendedly provided at a position where the hexagon shapes H of the hole portions 75 provided at the first and second intermediate seat materials 73, 74 configuring an intermediate member 77 are divided into two. The airbag 60 in the embodiment is configured such that the bonding portion α3 extending linearly defines the bag body 80 forming the seat materials 70 (71 to 74) into the first and second airbags 21, 22.

Figure 15:
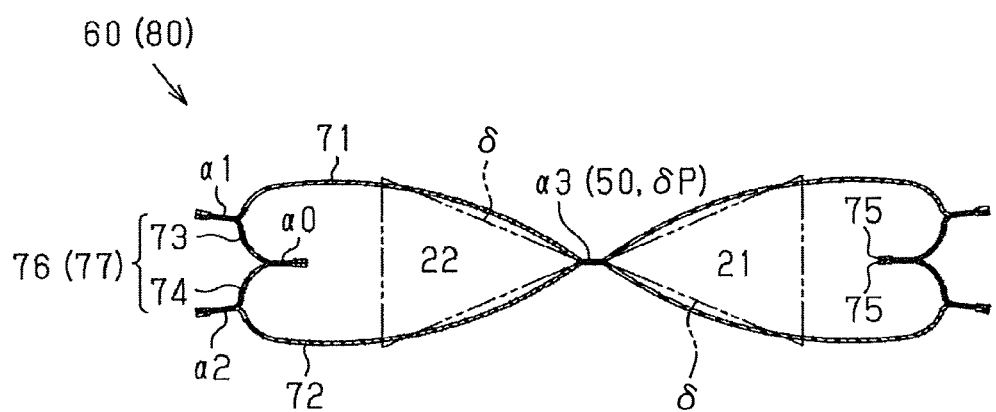
FIG. 15 is a cross sectional view of the airbag for seat support (expanding state)

That is, as shown in FIGS. 8, 10, and 15, in the airbag 60 in the embodiment, by the filling of air, the bag body 80 formed by the binding of the first and second intermediate seat material 73, 74 and the first and second outer seat materials 71, 72 expands. The bag body 80 including the first and second intermediate seat materials 73, 74 serving as the side wall portion 80sw.

The side wall portion 80sw of the bag body 80 formed by the first and second intermediate seat materials 73, 74 includes two triangle shapes D having the bonding portion α3 as a contact point by the first and second outer seat materials 71, 72 that bond to each other so as to divide the hexagon shapes H of the hole portions 75 provided at the first and second intermediate seat materials 73, 74 into two to be formed in a trapezoidal shape T. That is, sides 75c to 75f of the hole portion 75 serving as inclined sides Ts of the trapezoidal shape T of the hole portions 75, the inclined sides Ts dividing the hexagon shapes H, correspond to inclined sides Ds of the triangle shapes D formed at the side wall portions 80sw of the bag body 80. The airbag 60 in the embodiment is configured such that the triangle cross sections δ are set at the first and second airbags 21, 22 which are integrally provided with the bonding portion α3 between the first and second outer seat material 71, 72 as the connection portions 50.

Figure 16:
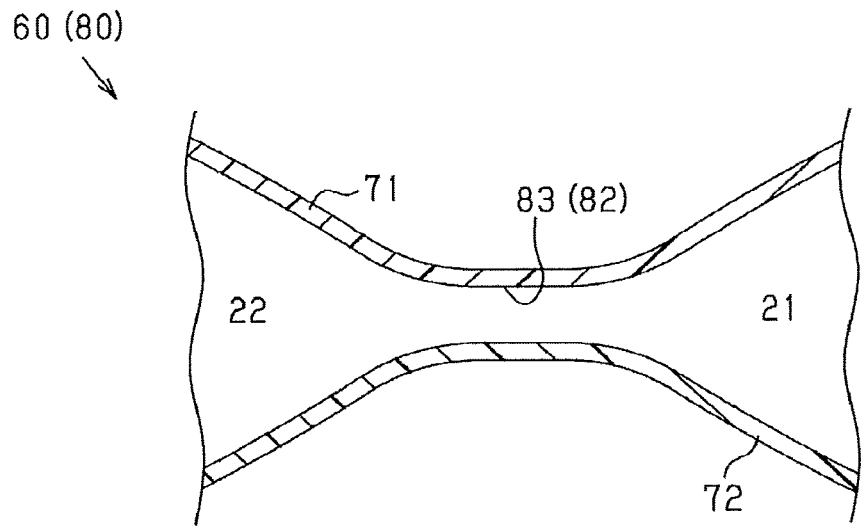
FIG. 16 is an enlarged cross sectional view of a vicinity of a through hole (cross sectional view taken along line XVI-XVI in FIG. 10, expanding state).

As illustrated in FIGS. 10 and 16, the airbag 60 in the embodiment includes non-bonding portions 82 where the first outer seat material 71 and the second outer seat material 72 do not bond with each other in the vicinity of both end portions of the seat materials 70 (71 to 74) in the longitudinal direction. That is, the airbag 60 in the embodiment is configured such that the non-bonding portions 82 are provided with connection holes 83 connecting the first airbag 21 and the second airbag 22. The airbag 60 in the embodiment may expand and contract the first and second airbags 21, 22 simultaneously.

Next, the effects and advantages of the embodiment will hereunder be explained.

The seatback 3 includes the movable cushion 5, the movable cushion is the divided part of the seatback 3, the divided part being inclined on the seat cushion 2 to form the seat portion HPc of the child seat 30. The seatback 3 includes the recessed portion 10 by the inclination of the movable cushion 5. The seatback 3 is configured such that the recessed portion 10 includes the backrest portion BPc of the child seat 30.

The seatback 3 includes the first airbag 21 disposed at the side wall portion 10x of the recessed portion 10, and the second airbag 22 disposed at the outer peripheral rim portion X of the recessed portion 10 being connected to the side wall portion 10x. The first and second airbags 21, 22 expand to form the support shape SS in the seat width direction relative to the child occupant C seated on the child seat 30 having the recessed portion 10 as the backrest portion BPc.

According to the aforementioned configuration, the child seat 30 may be easily deployed on the seat 1 by the inclination of the movable cushion 5 retracted in the seatback 3 on the seat cushion 2. In a case where the child seat 30 is not used, the movable cushion 5 may be stood to be integrated with the seatback 3 so that the child seat 30 may be easily and compactly retracted.

By the employment of the side wall portion 10x of the recessed portion 10 provided at the seatback 3, high support strength in the seat width direction may be applied relative to the backrest portion BPc of the child seat 30 deployed on the seat 1. By the expansion of the first airbag 21 provided at the side wall portion 10x of the recessed portion 10, the optimal support shape SS in the seat width direction so as to match the physical constitution of the child occupant C who is accommodated in the recessed portion 10 may be provided.

By the expansion of the second airbag 22 disposed at the outer peripheral rim portion X of the recessed portion 10, the support shape SS in the seat width direction forming the recessed portion 10 extends frontward of the seatback 3. Accordingly, the enhanced support strength in the seat width direction and the enhanced support performance in the seat width direction may be secured.

In addition, the depth of the recessed portion 10 formed at the seatback 3 may be set less. Accordingly, the thickness of the seatback 3 may be less.

The first and second airbags 21, 22 each includes the triangle cross section δ which is tapered toward the ridgeline portion 41 between the side wall portion 10x and the outer peripheral rim portion X of the recessed portion 10.

According to the aforementioned configuration, the support shape SS formed by the first and second airbags 21, 22 in the seat width direction may be set with the substantially-flat support surface FS. Accordingly, the support performance in the seat width direction may be favorably secured.

The first and second airbags 21, 22 are integrally provided as the single airbag 60 by including the top portions δp of the triangle cross sections δ as the connection portions 50. According to the aforementioned configuration, the first airbag 21 may be easily disposed at the side wall portion 10x of the recessed portion 10, and the second airbag 22 may be easily disposed at the outer peripheral rim portion X of the recessed portion 10 such that the connection portions 50 extending linearly extend along the ridgeline portion 41. Accordingly, the assembling operation may be simplified relative to the seatback 3.

The airbag 60 includes the first and second outer seat materials 71, 72, and the intermediate member 77 that is provided with the bag body 80 which is expandable and contractable by having the corrugated structure 76 to connect the first outer seat material 71 and the second outer seat material 72. The airbag 60 further includes the bonding portion α3 defining the bag body 80 into the first and second airbags 21, 22 by bonding the first outer seat material 71 and the second outer seat material 72 linearly.

According to the aforementioned configuration, the first and second airbags 21, 22 including the triangle cross sections δ and having the top portions δp as the connection portions 50 may be integrally formed in an expandable and contractable state.

The intermediate member 77 is provided such that the first and second intermediate seat materials 73, 74 including the hole portions 75 formed in the hexagon shapes H are bonded to each other along the periphery rims of the hole portions 75. The bonding portion α3 between the first outer seat material 71 and the second outer seat material 72 is extendedly provided at the position where the hexagon shape H of the hole portion 75 is divided into two.

According to the embodiment, the bag body 80 is provided by the bonding of the seat materials 70 (71 to 74) in a state where the first and second intermediate seat materials 73, 74 are sandwiched by the first and second outer seat materials 71, 72. Here, the first and second intermediate seat materials 73, 74 are provided with the side wall portions 80sw of the bag body 80 including the corrugated structure 76. The first and the second outer seat materials 71, 72 are bonded to each other by the division of each of the hexagon shapes H of the hole portions 75 provided at the first and second intermediate seat material 73, 74 into two. Accordingly, two triangle shapes D having the bonding portion α3 as a contact point are formed at the side wall portions 80sw of the bag body 80 formed by the first and second intermediate seat materials 73, 74. That is, the sides 75c to 75f of the hole portion 75 serving as the inclined sides Ts of the trapezoidal shape T dividing the hexagon shape H of the hole portion 75 into two correspond to the inclined surfaces Ds of the triangle shapes D formed at the side wall portions 80sw of the bag body 80. Accordingly, the first and second airbags 21, 22 may be set with the triangle cross sections δ having the connection portions 50 as the top portions δp with a simple configuration.

The aforementioned embodiment may be changed as follows. The aforementioned embodiment and a modified example below may be combined with each other to the extent that there is no technical contradiction.

In the aforementioned embodiment, the movable cushion 5 is the divided part of the seatback 3 being inclined toward the seat cushion 2 to form the recessed portion 10 including the side wall portion 10x in the seat width direction at the seatback 3. The first and second airbags 21, 22 configuring the airbag 20S for seat support are disposed at the side wall portion 10x of the recessed portion 10, and at the outer peripheral rim portion X of the recessed portion 10, respectively, the outer peripheral rim portion X being connected to the side wall portion 10x. Alternatively, for example, the moving mode of the movable cushion 5 forming the recessed portion 10 at the seatback 3, for example, the mode in which the movable cushion 5 is removed from the seatback 3, may be freely changed.

The movable cushion 5 provided at the seat cushion 2 corresponds to the divided part of the seatback 3, the divided part being moved from the seatback 3 to form the recessed portion 10 being provided with the side wall portion 10x at the seat cushion 2 in the seat width direction. Then, the first and second airbags 21, 22 may be disposed relative to the side wall portion 10x of the recessed portion 10 and the outer peripheral rim portion X of the seat cushion 2, respectively. That is, an occupant containing portion formed by the recessed portion 10 may correspond to the seat portion HPc instead of the backrest portion BPc. A retractable supplementary seat employing the recessed portion 10 provided with the first and second airbags 21,22 as the occupant containing portion does not necessarily have to correspond to the child seat 30 supporting the child occupant C, and may correspond to a seat for an adult occupant.

The seat 1 may be configured such that the recessed portion 10 provided with the first and second airbags 21, 22 may correspond to the occupant containing portion in normal use without the movement of the movable cushion 5. Even such configuration is adopted, the enhanced effectiveness in which the enhanced support strength in the seat width direction and the favorable support performance are secured may be obtained.

In the aforementioned embodiment, the airbags 20S (21, 22) for seat support are disposed between the cushion material 15 and the cover 11 forming the outer shape of the seatback 3. Alternatively, for example, a cushion material of a backside of a cover or other materials may be sandwiched between the airbags 20S for seat support and the cover 11. A part or all of the airbags 20S for seat support may be exposed outside of the cover 11.

The first and second airbags 21, 22 in the embodiment are integrally provided to include the single airbag 60 (20S). Alternatively, the first and second airbags 21, 22 may be separately formed and disposed at the side wall portion 10x and the outer peripheral rim portion X of the recessed portion 10, respectively. The support shape SS formed by the first and second airbags 21, 22 in the seat width direction does not necessarily have to include the flat support surface FS.

The air bag 60 (20S) provided by the integration of the first and second airbags 21, 22 in the embodiment includes the configuration in which the four seat materials 70 (71 to 74) that are bonded to one another. Alternatively, the first and second airbags 21, 22 may include the intermediate member 77 that includes the corrugated structure 76 which employs, for example, three or more intermediate seat materials. Then, the first and second airbags 21, 22 which are separately formed may be integrally bonded to form the single airbag 60.

The hole portions 75 provided at the first and second intermediate seat materials 73, 74 include the hexagon shapes H. Alternatively, the hold portions 75 each may be formed in, for example, a round shape, an ellipse shape, or a polygonal shape other than the hexagon shape. However, in terms of setting the triangle cross sections δ at the first and second airbags 21, 22, it is favorable that parts forming the inclination sides Ds of the triangle shape D, that is, the parts corresponding to the sides 75c to 75f of the hole portion 75 in the embodiment, are provided at the side wall portions 80sw of the bag body 80.

The seat device (40) for a vehicle includes the first airbag (21) being disposed at the side wall portion (10x) of the recessed portion (10) which is configured to accommodate the occupant of the seat (1) therein; and the second airbag (22) being disposed at the outer peripheral rim portion (X) of the recessed portion (10), the outer peripheral rim portion (X) which is connected to the side wall portion (10x). The first airbag (21) and the second airbag (22) expand to form the support shape (SS) at the recessed portion (10) in the seat width direction.

According to the aforementioned configuration, by the employment of the side wall portion (80sw) in the seat width direction, high support strength in the seat width direction relative to the occupant containing portion (the first and second airbags 21, 22) formed by the recessed portion (10) provided at the seat (1) may be applied. By the expansion of the first airbag (21) provided at the side wall portion (80sw) of the recessed portion (10), the optimal support shape in the seat width direction which matches the physical constitution of the occupant who is contained in the recessed portion (10) may be provided. By the expansion of the second airbag (22) disposed at the outer peripheral rim portion (X) of the recessed portion (10), the support shape in the seat width direction forming the recessed portion (10) extends outward. Accordingly, the enhanced support strength in the seat width direction and the enhanced support performance in the seat width direction may be secured.

According to the aforementioned embodiment, the first airbag (21) and the second airbag (22) include triangle cross sections (6) that are tapered towards the ridgeline portion (41) between the side wall portion (10x) and the outer peripheral rim portion (X) of the recessed portion (10).

According to the aforementioned configuration, the support shape formed by the first and second airbags (21, 22) in the seat width direction may be set with the substantially-flat support surface. Accordingly, the support performance in the seat width direction may be favorably secured.

According to the aforementioned embodiment, the seat device (40) for the vehicle further includes the airbag (20S) for seat support in which the first airbag (21) and the second airbag (22) are integrally formed such that top portions (δp) of the triangle cross sections (δ) serve as the connection portions (50) of the first airbag (21) and the second airbag (22).

According to the aforementioned configuration, the first airbag (21) may be easily disposed at the side wall portion (10x) of the recessed portion (10), and the second airbag (22) may be easily disposed at the outer peripheral rim portion (X) of the recessed portion (10) by the connection portions (50) extending linearly along the ridgeline portion (41). Accordingly, the assembling operation may be simplified relative to the seatback (3).

According to the aforementioned embodiment, the airbag (20S) for seat support includes the first outer seat material (71), the second outer seat material (72), the intermediate member (77) forming a bag body (80) which is expandable and contractable by connecting the first outer seat material (71) and the second outer seat material (72) to include the corrugated structure (76), the bonding portion (α3) defining the bag body (80) into the first airbag (21) and the second airbag (22) by bonding the first outer seat material (71) and the second outer seat material (72) in a linear manner.

According to the aforementioned configuration, the first and second airbags (21, 22) including the triangle cross sections (δ) having the top portions (δp) as the connection portions (50) may be integrally formed in an expandable and contractable state.

According to the aforementioned embodiment, the intermediate member (77) includes the first intermediate seat material (73) and the second intermediate seat material (74) including hole portions (75) each being formed in the hexagon shape (H), the intermediate member (77) being configured such that the first intermediate seat material (73) and the second intermediate seat material (74) are bonded to each other along the peripheral rims of the hole portions (75). The bonding portion (α3) bonding the first outer seat material (71) and the second outer seat material (72) is extendedly provided at the position where the hexagon shape (H) of the hole portion (75) is divided into two to be formed in the trapezoidal shape (T).

According to the embodiment, the bag body (80) is provided by the bonding of the seat materials 70 (71 to 74) in a state where the first and second intermediate seat materials (73, 74) are sandwiched by the first and second outer seat materials (71, 72). Here, the first and second intermediate seat materials (73, 74) are provided with the side wall portions (80sw) of the bag body (80) including the corrugated structure (76). By the bonding of the first and second outer seat materials (71, 72) so as to divide the hexagon shape (H) of the hole portions (75) provided at the first and second intermediate seat materials (73, 74) into two, the two triangle shapes (D) may be formed such that the bonding portion (α3) serving as a contact point is provided at the side wall portion (80sw) of the bag body (80) formed by the first and second intermediate seat materials (73, 74). That is, the sides of the hole portion (75) serving as the inclined sides (Ts) of the trapezoidal shape (T) dividing the hexagon shape (H) of the hole portion (75) into two corresponds to the inclined side (Ds) of the triangle shape (D) formed at the side wall portion (80sw) of the bag body (80). Accordingly, the first and second airbags (21, 22) may be set with the triangle cross sections (δ) having the connection portions (50) as the top portions (δp) with a simple configuration.

According to the aforementioned embodiment, the seat device (40) for the vehicle further includes the movable cushion (5) which is the divided part of the seatback (3), the divided part being moved from the seatback (3) to form the recessed portion (10) at the seatback (3), the recessed portion (10) constituting the backrest portion (BPc) of the child seat (30).

According to the aforementioned configuration, the seatback (3) may be easily provided with the backrest portion (BP) of the child seat (30) by moving the movable cushion (5) retracted in the seatback (3). In a case where the child seat (30) is not used, the movable cushion (5) may be integrated with the seatback (3) so that the child seat (30) may be easily and compactly retracted.

According to the aforementioned embodiment, the movable cushion (5) is configured to form the seat portion (HPc) of the child seat (30) by being inclined on the seat cushion (2).

According to the aforementioned configuration, the child seat (30) may be easily deployed by the inclination of the movable cushion (5) retracted in the seatback (3) on the seat cushion (5). In a case where the child seat (30) is not used, the movable cushion (5) may stands be integrated with the seatback (3) so that the child seat (30) may be easily and compactly retracted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat device for a vehicle, comprising:
   a combination airbag for seat support, including
      a first airbag being disposed at a laterally facing side wall portion of a recessed portion in a seatback, the recessed portion configured to accommodate an occupant of a seat therein; and
      a second airbag being disposed at an outer peripheral rim portion of the recessed portion, the outer peripheral rim portion which is disposed forwardly and connected to the side wall portion, wherein
   the first airbag and the second airbag expand to form a support shape at the recessed portion in a seat width direction,
   the first airbag and the second airbag include triangle cross sections that are tapered towards a ridgeline portion between the side wall portion and the outer peripheral rim portion of the recessed portion,
   the first airbag and the second airbag are integrally formed such that apex portions of the triangle cross sections serve as connection portions of the first airbag and the second airbag, and
   the connection portions abut the ridgeline portion.

2. The seat device for the vehicle according to claim 1, wherein the combination airbag for seat support includes
   a first outer seat material;
   a second outer seat material;
   an intermediate member forming a bag body which is expandable and contractable by connecting the first outer seat material and the second outer seat material to include a corrugated structure; and
   a bonding portion defining the bag body into the first airbag and the second airbag by bonding the first outer seat material and the second outer seat material in a linear manner.

3. The seat device for the vehicle according to claim 2, wherein
   the intermediate member includes a first intermediate seat material and a second intermediate seat material including respective hole portions each being formed in a hexagon shape, the intermediate member being configured such that the first intermediate seat material and the second intermediate seat material are bonded to each other along peripheral rims of the hole portions, and
   the bonding portion bonding the first outer seat material and the second outer seat material is extendedly provided at a position where the hexagon shape of the hole portion is divided into two to be formed into two trapezoidal shapes.

4. The seat device for the vehicle according to claim 2, further comprising:
   a movable cushion which is a divided part of a seatback, the divided part being moved from the seatback to form a recessed portion at the seatback, the recessed portion constituting a backrest portion of a child seat.

5. The seat device for the vehicle according to claim 3, further comprising:
   a movable cushion which is a divided part of a seatback, the divided part being moved from the seatback to form a recessed portion at the seatback, the recessed portion constituting a backrest portion of a child seat.

6. The seat device for the vehicle according to claim 4, wherein the movable cushion is configured to form a seat portion of the child seat by being inclined on the seat cushion.

7. The seat device for the vehicle according to claim 5, wherein the movable cushion is configured to form a seat portion of the child seat by being inclined on the seat cushion.

* * * * *